(12) United States Patent
Wang et al.

(10) Patent No.: US 10,705,676 B2
(45) Date of Patent: Jul. 7, 2020

(54) METHOD AND DEVICE FOR INTERACTING WITH BUTTON

(71) Applicant: Xiaomi Inc., Beijing (CN)

(72) Inventors: Yang Wang, Beijing (CN); Qiang Fu, Beijing (CN); Hao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 466 days.

(21) Appl. No.: 15/226,511

(22) Filed: Aug. 2, 2016

(65) Prior Publication Data

US 2016/0342302 A1 Nov. 24, 2016

Related U.S. Application Data

(63) Continuation of application No. PCT/CN2015/093065, filed on Oct. 28, 2015.

(30) Foreign Application Priority Data

Jan. 23, 2015 (CN) .......................... 2015 1 0036107

(51) Int. Cl.
*G06F 3/0481* (2013.01)
*G06F 3/0488* (2013.01)
*G06F 3/041* (2006.01)

(52) U.S. Cl.
CPC ........ *G06F 3/04812* (2013.01); *G06F 3/0414* (2013.01); *G06F 3/0416* (2013.01);
(Continued)

(58) Field of Classification Search
CPC .. G06F 3/04812; G06F 3/0414; G06F 3/0416; G06F 3/0481
(Continued)

(56) References Cited

U.S. PATENT DOCUMENTS

| 5,694,562 A | 12/1997 | Fisher |
| 6,825,861 B2 | 11/2004 | Wasko et al. |

(Continued)

FOREIGN PATENT DOCUMENTS

| CN | 1613057 A | 5/2005 |
| CN | 102654831 A | 9/2012 |

(Continued)

OTHER PUBLICATIONS

"Roll over—revolving hovering, click relevant content," [Online], URL: http://kin.naver.com/qna/detail.nhn?d1id=1&dirld=1040202 &docId=66284324, Apr. 25, 2007, 12 pages.
(Continued)

*Primary Examiner* — Nicholas McFall
*Assistant Examiner* — Terri L Filosi
(74) *Attorney, Agent, or Firm* — Arch & Lake LLP (57) ABSTRACT

The present disclosure provides a method of for interacting with a button. The method includes determining whether a state of the button is being switched among a normal state, a hover state, and a press state, presenting a first predetermined pattern around the button in response to determining that a state of the button is being switched from the normal state to the hover state; and presenting a second predetermined pattern around the button in response to determining that the state of the button is being switched from the hover state to the press state. The first and second predetermined patterns are displayed to a user switching the button. Through the present disclosure, a clear and accurate interaction indication and the whole interaction process can be presented to the user during button interaction, improving the user experience during interaction.

20 Claims, 6 Drawing Sheets

(52) U.S. Cl.
CPC ........ *G06F 3/0488* (2013.01); *G06F 3/04883* (2013.01); *G06F 3/04886* (2013.01); *G06F 2203/04105* (2013.01); *G06F 2203/04108* (2013.01)

(58) Field of Classification Search
USPC ....................................................... 715/773
See application file for complete search history.

(56) References Cited

U.S. PATENT DOCUMENTS

| | | | |
|---|---|---|---|
| 2010/0177049 | A1 | 7/2010 | Levy et al. |
| 2010/0199221 | A1* | 8/2010 | Yeung ................ G06K 9/00362 715/850 |
| 2012/0102401 | A1* | 4/2012 | Ijas ..................... G06F 3/04842 715/702 |
| 2012/0274662 | A1 | 11/2012 | Kim et al. |
| 2013/0036380 | A1 | 2/2013 | Symons |
| 2013/0311294 | A1* | 11/2013 | Ward ................. G06Q 30/0267 705/14.64 |
| 2014/0177396 | A1 | 6/2014 | Lee et al. |
| 2014/0253465 | A1* | 9/2014 | Hicks ................. G06F 3/03545 345/173 |
| 2015/0332107 | A1 | 11/2015 | Paniaras |
| 2016/0224220 | A1* | 8/2016 | Ganguly ............... G06F 3/0416 |
| 2017/0139565 | A1* | 5/2017 | Choi ..................... G06F 3/0483 |

FOREIGN PATENT DOCUMENTS

| | | |
|---|---|---|
| CN | 102799347 A | 11/2012 |
| CN | 103021410 A | 4/2013 |
| CN | 103218127 A | 7/2013 |
| CN | 103246475 A | 8/2013 |
| CN | 103631379 A | 3/2014 |
| CN | 103677981 A | 3/2014 |
| CN | 103699413 A | 4/2014 |
| CN | 103733197 A | 4/2014 |
| CN | 103748586 A | 4/2014 |
| CN | 103885703 A | 6/2014 |
| CN | 104035820 A | 9/2014 |
| CN | 104598112 A | 5/2015 |
| EP | 2746926 A2 | 6/2014 |
| JP | H08227341 A | 9/1996 |
| JP | 2004102500 A | 4/2004 |
| JP | 2007086977 A | 4/2007 |
| JP | 2013109587 A | 6/2013 |
| JP | 2014093046 A | 5/2014 |
| JP | 2015501015 A | 1/2015 |
| KR | 20120023339 A | 3/2012 |
| RU | 2464624 C2 | 10/2012 |
| WO | 2014100953 A1 | 7/2014 |

OTHER PUBLICATIONS

"CSS Transforms Module Level 1, W3C Working Draft, Nov. 26, 2013," W3C, [Online], URL: http://www.w3.org/TR/2013/WD-css-transforms-1-20131126/, Nov. 26, 2013, 48 pages.

"Creating Hover Effects with CSS3 Animations—hover.css," [Online] URL: http://www.cssscript.com/tag/hover-effect/, http://www.cssscript.com/demo/creating-hovereffects-with-css3-animations-hover-css/, Jan. 8, 2014, 17 pages.

First Office Action (including English translation) issued in corresponding Chinese Patent Application No. 201510036107.6, dated May 2, 2017, 17 pages.

Extended European search report issued in corresponding European Application No. 15858090.2, dated Apr. 4, 2017, 7 pages.

International Search Report (including English translation) issued in corresponding International Application No. PCT/CN2015/093065, dated Jan. 8, 2016, 4 pages.

Notification of Reasons for Refusal (including English translation) issued in corresponding Japanese Patent Application No. 2016-570158, dated May 11, 2017, 9 pages.

Decision to Grant a Patent (including English translation) issued in corresponding Japanese Patent Application No. 2016-570158, dated Aug. 31, 2017, 6 pages.

Notification of Reason for Refusal (including English translation) issued in corresponding Korean Patent Application No. 10-2015-7036562, dated Jan. 26, 2017, 11 pages.

Notification of Reason for Refusal (including English translation) issued in corresponding Korean Patent Application No. 10-2015-7036562, dated Jul. 30, 2017, 12 pages.

Official Action issued in corresponding Russian Patent Application No. 2016114553/08(022921), dated Jul. 18, 2017, 6 pages.

International Search Report to PCT/CN2015/093065 dated Jan. 8, 2016, (4p).

Chinese Office Action (including English translation) issued in corresponding CN Patent Application 201510036107.6, dated Jul. 3, 2018, 19 pages.

First Office Action issued to Indian Patent Application No. 201637003101, dated Dec. 18, 2019, (6p).

Second Office Action issued to European Patent Application No. 15858090.2 dated Feb. 21, 2020, (13p).

\* cited by examiner

METHOD AND DEVICE FOR INTERACTING WITH BUTTON

CROSS-REFERENCE TO RELATED APPLICATIONS

The present application is a continuation of International Application No. PCT/CN2015/093065, filed Oct. 28, 2015, which is based upon and claims priority to Chinese Patent Application No. 201510036107.6, filed Jan. 23, 2015, the entire contents of which are incorporated herein by reference.

TECHNICAL FIELD

The present disclosure generally relates to the field of communication, and more particularly, to a method and a device for interacting with a button.

BACKGROUND

Interacting with a button refers to providing a button on an interaction interface, for a user to click the button with a mouse or touch the button with his finger, so as to trigger a corresponding response through human-machine interaction. Currently, button interaction is applied widely in fields such as web solution and application (APP) development. In web solution or APP development, real-time and diversified human-machine interaction functions can be achieved through button interaction. The operation is convenient and can make the interaction more intuitive.

However, with the continuous development of the Internet, high requirements for diversity of human-machine interaction are proposed. Accordingly, how to improve interaction efficiency and interaction experience during button interaction has been an interest in the field.

SUMMARY

According to a first aspect of embodiments of the present disclosure, there is provided a method for interacting with a button, including determining whether a state of the button is being switched among a normal state, a hover state, and a press state, presenting a first predetermined pattern around the button in response to determining that a state of the button is being switched from the normal state to the hover state, and presenting a second predetermined pattern around the button in response to determining that the state of the button is being switched from the hover state to the press state, wherein the first and second predetermined patterns are displayed to a user interacting with the button.

According to a second aspect of embodiments of the present disclosure, there is provided a device for interacting with a button, including a processor, and a memory for storing instructions executable by the processor. The processor is configured to perform determining whether a state of the button is being switched among a normal state, a hover state, and a press state, and presenting a first predetermined pattern around the button in response to determining that a state of the button is being switched from the normal state to the hover state, and presenting a second predetermined pattern around the button in response to determining that the state of the button is being switched from the hover state to the press state, wherein the first and second predetermined patterns are displayed to a user interacting with the button.

According to a third aspect of embodiments of the present disclosure, there is provided a non-transitory computer-readable storage medium storing instructions that, when being executed by a processor of a device for interacting with a button, cause the device to perform determining whether a state of the button is being switched among a normal state, a hover state, and a press state, and presenting a first predetermined pattern around the button in response to determining that a state of the button is being switched from the normal state to the hover state, and presenting a second predetermined pattern around the button in response to determining that the state of the button is being switched from the hover state to the press state, wherein the first and second predetermined patterns are displayed to a user interacting with the button.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used herein are merely for describing a particular embodiment, rather than limiting the present disclosure. As used in the present disclosure and the appended claims, terms in singular form such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the text, a term "if" as used herein can be interpreted as "when", "where" or "in response to".

In a conventional button interaction process, a button has three states: a Normal state, a Hover state and a Press state. The Normal state refers to a default appearance or an appearance of a button when the button is static. The Hover state refers to a hovering state presented by a button when a mouse moves over the button or moves away from the button, and the Hover state can be typically considered as a transition state which prompts the user to click the button to trigger an event. The Press state refers to a state of a button which is pressed down, and typically, when a button is in the Press state, an event will be triggered. For example, when an on/off button of a smart device is in the Press state, typically an event of turning on or off the smart device will be triggered.

In conventional interface interaction solution, different styles are devised for the above three states of a button. Thereby, in human-machine interaction through the button and the interaction interface, interacting indication can be presented to a user. For example, in a common solution, when a Normal state of a button is switched to a different state such as the Hover state or the Press state, the Hover state or the Press state can be distinguished through different colors presented by the button.

In addition, in conventional interface interaction solution, apart from the three button states, typically an additional Loading state can be provided. The Loading state which indicates one of different states is typically devised as a loading animation representing a loading process of an event triggered by switching the state of the button to the Press state.

Figure 1:
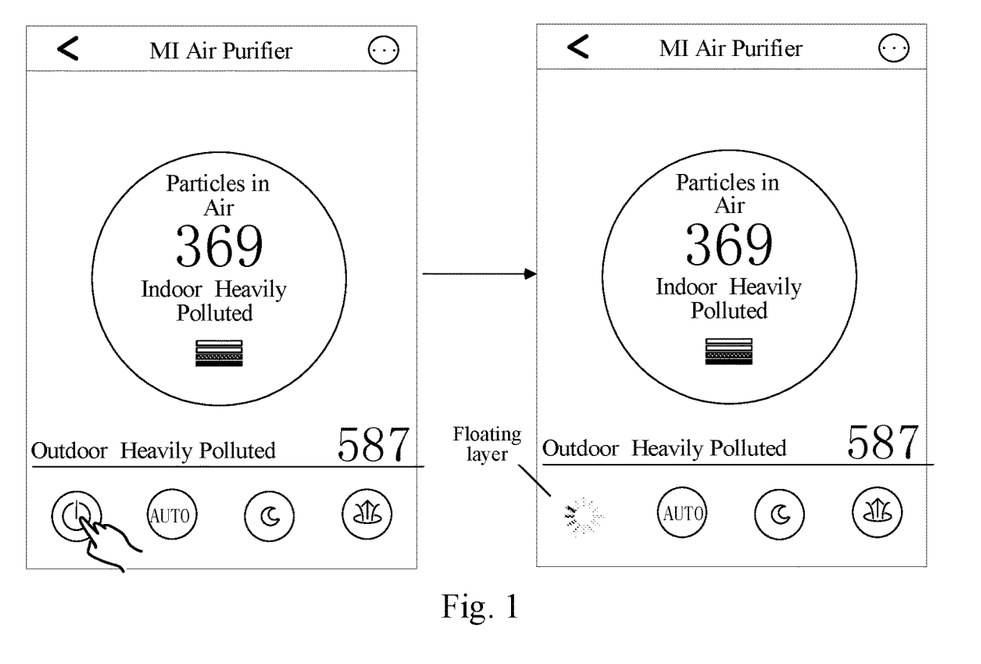
FIG. 1 is a schematic diagram showing a conventional interaction interface according to an exemplary embodiment.

For example, the button can be an on/off button of an APP for remotely controlling a smart device which is installed on a terminal. When the button is in the Press state (means that the button is pressed down or touched), typically, an event for turning on the smart device can be triggered. After the event is triggered, the terminal can send a turning on instruction to the smart device. After the smart device receives the turning on instruction, the smart device is turned on, and after the smart device is properly turned on, the smart device returns a response message to the terminal indicating that the smart device has been properly turned on. Thus, as shown in FIG. 1, when the terminal sends the turning on instruction, a floating layer can be presented over the region of the button, and a loading animation representing the loading process of the event can be presented on the floating layer, as shown in FIG. 1. When the smart device is properly turned on and the terminal receives the response message indicating proper turn-on returned by the smart device, the loading of the event of turning on the smart device finishes. Then the presentation of the loading animation can stop, and the floating layer is removed. At this time, in the region of the button, a style of the Press state is normally displayed.

It can be seen from the above that, there are at least the following defects in the conventional interface interaction.

First, according to the conventional interface, it is not satisfactory for interaction, merely presenting interaction indication to a user by providing different styles (e.g. different colors) of buttons for different button states. In particular, for an interface on a touch screen, when a user is interacting with a button with his finger, the finger may obstruct the button from his view, causing a problem that the presentation of the interaction indication is not clear or accurate.

Second, according to the conventional solution, the loading process of an event triggered by switching a state of a button to the Press state, is represented by a Loading state. In implementation, a separate floating layer is to be presented over the region of the button for presenting a loading animation corresponding to the Loading state. This reduces design supporting capability on per unit area of the interaction interface, so the design space cannot be sufficiently utilized, and the design efficiency is rather low.

In view of the above, the present disclosure provides a method for interacting with a button, in which it is determined whether a state of the button is being switched, and a fluctuating pattern is presented around the button when a state of the button is being switched. The fluctuating pattern is used for indicating interaction and representing a loading process of an event triggered by the switch of the state of the button. Thereby, in the present disclosure, the Hover state, Press state and Loading state of a button can be uniformly devised. It reserves the interaction functions of the button states and loading animation in the conventional interface interaction solution. Moreover, the styles of the button states and loading animation of the Loading state in the conventional solution are unified to a uniform fluctuating pattern disposed around the button, for indicating interaction to the user and representing the loading process of the event triggered by the switch of the state of the button. It can incorporate visual focus and operation point. A clear and accurate interaction indication and the whole interaction process can be presented to the user during button interaction, improving the user experience during interaction.

Figure 2:
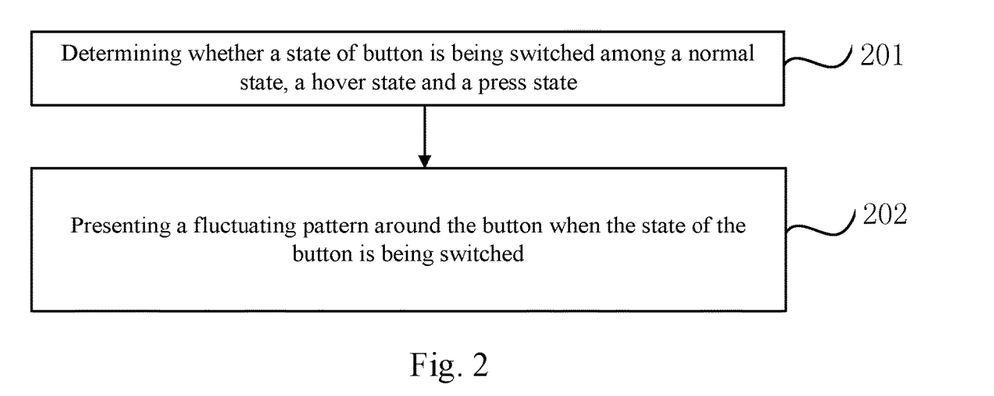
FIG. 2 is a flow chart showing a method for interacting with a button according to an exemplary embodiment.

FIG. 2 is a flow chart showing a method for interacting with a button according to an exemplary embodiment, which is applied in a terminal, including the following steps.

In step 201, it is determined whether a state of the button is being switched. In the present embodiment, a button can have three states: a Normal state, a Hover state and a Press state. Determining whether a state of the button is being switched can be implemented differently in different hardware environment of the terminal. For example, for a touch-screen terminal, switching of a state of a button is typically triggered by a touch event with respect to a region where the button is positioned. Accordingly, determining whether a state of the button is being switched can be implemented by monitoring a touch event with respect to the region where the button is positioned. For a PC terminal, switching of a state of a button is typically triggered by a mouse event with respect to the region where the button is positioned. Accordingly, determining whether a state of the button is being switched can be implemented by monitoring a mouse event with respect to the region where the button is positioned.

The process will be described in connection with the above two different terminal hardware environments as below.

For the touch-screen terminal, typically, the button can be switched from the Normal state to the Hover state by a long press operation with respect to the region where the button is positioned. The button can be switched from the Hover state to the Press state by a releasing operation after the long press operation with respect to the region where the button is positioned.

Accordingly, to determine whether a state of the button is being switched, the touch-screen terminal can monitor in real time whether a touch event occurs on the region where the button is positioned on a touch screen, and determine whether a monitored touch event is a preset event. If it is determined that the touch event is a long press event (a first preset event), the button can be triggered from the Normal state to the Hover state. Thus, after the touch-screen terminal determines that the touch event is the long press event, the touch-screen terminal can determine in the background that the button has been currently switched from the Normal state to the Hover state.

After the button is switched to the Hover state, the touch-screen terminal can continue to monitor whether a touch event occurs on the region of the button on the touch screen. If after the button is switched to the Hover state, another touch event with respect to the region of the button is monitored, and it is determined that said another touch event is a releasing event (a second preset event), then it can be determined in the background that the button is being switched from the Hover state to a Press state. Thus, after the touch-screen terminal determines that the touch event is the releasing event, the touch-screen terminal can determine that the button has been currently switched from the Hover state to the Press state.

For a PC terminal, typically, the button can be switched from the Normal state to the Hover state by a mouse hovering operation with respect to the region where the button is positioned. The button can be switched from the Hover state to the Press state by a click operation after the mouse hovering operation with respect to the region where the button is positioned.

Accordingly, to determine whether a state of the button is being switched, the PC terminal can monitor in real time a mouse event with respect to the region where the button is positioned in the background, and determine whether a monitored mouse event is a preset event. If it is determined that the mouse event is a mouse hovering event (a third preset event), the button can be triggered from the Normal state to the Hover state. Thus, after the PC terminal determines that the mouse event is the mouse hovering event, the PC terminal can determine in the background that the button has been currently switched from the Normal state to the Hover state.

After the button is switched to the Hover state, the PC terminal can continue to monitor in the background a mouse event with respect to the region of the button. If after the button is switched to the Hover state, another mouse event with respect to the region of the button is monitored, and it is determined that said another mouse event is a mouse click event (a fourth preset event), the button can be triggered from the Hover state to the Press state. Thus, after the PC terminal determines that the mouse event is the mouse click event, the PC terminal can determine in the background that the button has been currently switched from the Hover state to the Press state.

In step 202, a fluctuating pattern is presented around the button when a state of the button is being switched. The fluctuating pattern is used for indicating interaction and representing a loading process of an event triggered by the switch of the state of the button.

In the present embodiment, when the state of the button is being switched, the button can be switched from the Normal state to the Hover state, or can be switched from the Hover state to the Press state. Accordingly, in the present embodiment, in order to uniform displays representing the states of the button, a fluctuating pattern can be uniformly presented around the button, regardless the button is being switched from the Normal state to the Hover state or from the Hover state to the Press state. Thereby, when the button is being switched from the Normal state to the Hover state, the fluctuating pattern can indicate an interaction to the user. When the button is being switched from the Hover state to the Press state, the pattern can function in place of the Loading state, to represent the loading process of the event triggered by the switch of the state of the button from the Hover state to the Press state.

In implementation, since presenting an interaction indication to the user is typically a static process, when the button is being switched from the Normal state to the Hover state, the fluctuating pattern can be presented around the button in a static manner to indicate interaction to the user. In addition, since the loading process of an event triggered by the switch of the state from the Hover state to the Press state is typically a dynamic process, when the button is being switched from the Hover state to the Press state, the fluctuating pattern can be presented around the button in a dynamic manner with a preset fluctuation cycle, and after the loading process of the event triggered by the button being switched from the Hover state to the Press state is completed, presenting of the fluctuating pattern is ceased. Thereby, the whole loading process of the event can be presented to the user by presenting the fluctuating pattern in the dynamic manner. In one implementation, the fluctuating pattern can be a ripple pattern. Hereinafter, as an example, the fluctuating pattern is a ripple pattern.

In the present embodiment, when the user switches the button from the Normal state to the Hover state through a long press operation or a mouse hovering operation with respect to the button, a ripple pattern around the button can be presented in a static manner, so as to indicate the interaction to the user. After he sees the interaction indication, the user can accurately learn that the button has currently been switched to the Hover state. In addition, to improve the indication effect, in case where the button is switched from the Normal state to the Hover state through a long press operation, a pressure of a press operation with respect to the region of the button can be acquired, and the ripple pattern with a preset number of lines based on the pressure of the press operation is presented. In this case, the number of the lines of the presented ripple pattern can be based on the magnitude of the pressure of the press operation. That is, the larger the pressure of the press operation is, the more the lines of the ripple pattern presented around the button in the static manner are.

In the present embodiment, after the button is switched from the Hover state to the Press state through a releasing operation after the long press operation or a mouse click operation, the ripple pattern around the button can be presented as diffusing outward from a periphery of the button with a cycle and at a preset diffusion rate.

In implementation, a ripple generating source can be provided at the periphery of the button. Thus, the terminal can control the ripple generating source to generate a ripple at a fixed time interval in the background, and control each ripple to diffuse outward at a preset diffusion rate. Moreover, in order to improve the interaction effect, the ripple pattern can gradually attenuate during the outward diffusion. The terminal can control the interaction interface to refresh the interface periodically at a certain frequency. After each refresh, a current position and the attenuation of the ripple are calculated, and then the ripple is presented on the interaction interface. The refresh frequency of the interface can be set depending on practical requirements. For example, in implementation, a higher refresh frequency can be set to ensure a satisfactory effect. The attenuation process of the ripple pattern can be represented through varied brightness of the ripples.

In the present embodiment, at the time when the loading of the event triggered by the switch of the state of the button from the Hover state to the Press state is completed, the periodic outer diffusion of the ripple pattern around button can be ceased synchronously. Thereby, the dynamic presentation of the fluctuating pattern can be fully associated with the loading process of the event, and the whole loading process of the event can be presented to the user by synchronously presenting the wave-ripple pattern.

It should be noted that, after the button is switched to the Press state, the button is in the Press state. At this time, if he wants to resume the "Pressed" button to an un-pressed state, the user can perform another designated touch operation or mouse operation with respect to the region where the button is positioned, to complete the switch of the button. In this case, the Press state of the button can be considered as a current Normal state, and the Normal state before the button is pressed can be considered as a current Press state. When the button is switched from the current Normal state to the Press state, the button is in an "un-pressed" state. The switching of the button can be referred to the above embodiments, which will not be elaborated in the present embodiment.

In the above embodiment, it is determined whether a state of the button is being switched. A fluctuating pattern is presented around the button when a state of the button is being switched. The fluctuating pattern is used for indicating interaction and representing a loading process of an event triggered by the switch of the state of the button. Thereby, in the present disclosure, the Hover state, Press state and Loading state of a button can be uniformly devised with the help of the fluctuating pattern. It reserves the interaction functions of the button states and loading animation in the conventional interface interaction solution. Moreover, the styles of the button states and loading animation of the Loading state in the conventional solution are unified to a uniform fluctuating pattern disposed around the button, for indicating interaction to the user and representing the loading process of the event triggered by the switch of the state of the button. It can incorporate visual focus and operation point. A clear and accurate interaction indication and the whole interaction process can be presented to the user during button interaction, improving the user experience during interaction.

Figure 3:
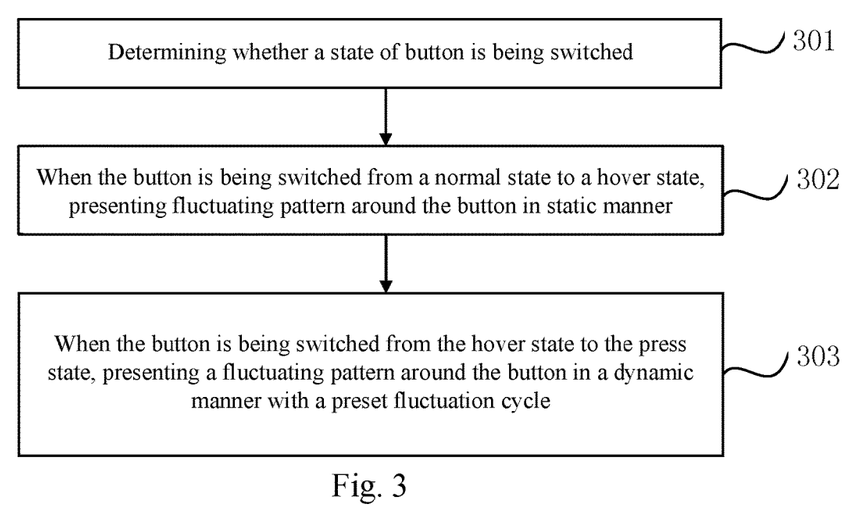
FIG. 3 is a flow chart showing another method for interacting with a button according to an exemplary embodiment.

FIG. 3 is a flow chart showing another method for interacting with a button according to an exemplary embodiment, which is applied in a terminal which can be a PC terminal or a touch-screen smart terminal. The method can include the following steps.

In step 301, it is determined whether a state of the button is being switched. In step 302, when the button is being switched from the Normal state to the Hover state, a fluctuating pattern is presented around the button in a static manner to indicate interaction. In step 303, when the button is being switched from the Hover state to the Press state, the fluctuating pattern is presented around the button in a dynamic manner with a preset fluctuation cycle. After the loading process of the event triggered by the button being switched from the Hover state to the Press state is completed, presenting of the fluctuating pattern is ceased.

It should be noted that the above step 302 and the step 303 can be exchanged with each other.

In the present embodiment, a button can have three states: a Normal state, a Hover state and a Press state. Determining whether a state of the button is being switched can be implemented differently in different hardware environment of the terminal. For example, for a touch-screen terminal, switching of a state of a button is typically triggered by a touch event with respect to a region where the button is positioned. Accordingly, determining whether a state of the button is being switched can be implemented by monitoring a touch event with respect to the region where the button is positioned. For a PC terminal, switching of a state of a button is typically triggered by a mouse event with respect to the region where the button is positioned. Accordingly, determining whether a state of the button is being switched can be implemented by monitoring a mouse event with respect to the region where the button is positioned.

The process will be described in connection with the above two different terminal hardware environments as below.

For the touch-screen terminal, typically, the button can be switched from the Normal state to the Hover state by a long press operation with respect to the region where the button is positioned. The button can be switched from the Hover state to the Press state by a releasing operation after the long press operation with respect to the region where the button is positioned.

Accordingly, to determine whether a state of the button is being switched, the touch-screen terminal can monitor in real time a touch event with respect to the region where the button is positioned on the touch screen, and determine whether a monitored touch event is a preset event. If it is determined that the touch event is a long press event (a first preset event), the button can be triggered from the Normal state to the Hover state. Thus, after the touch-screen terminal determines that the touch event is the long press event, the touch-screen terminal can determine that the button has been currently switched from the Normal state to the Hover state.

After the button is switched to the Hover state, the touch-screen terminal can continue to monitor a touch event with respect to the region of the button. If after the button is switched to the Hover state, another touch event with respect to the region of the button is monitored, and it is determined that said another touch event is a releasing event (a second preset event), it can be determined in the background that the button is being switched from the Hover state to a Press state. Thus, after the touch-screen terminal determines that the touch event is the releasing event, the touch-screen terminal can determine in the background that the button has been currently switched from the Hover state to the Press state.

For a PC terminal, typically, the button can be switched from the Normal state to the Hover state by a mouse hovering operation with respect to the region where the button is positioned. The button can be switched from the Hover state to the Press state by a click operation after the mouse hovering operation with respect to the region where the button is positioned.

Accordingly, in determining whether a state of the button is being switched, the PC terminal can monitor in real time a mouse event with respect to the region where the button is positioned in the background, and determine whether a monitored mouse event is a preset event. If it is determined that the mouse event is a mouse hovering event (a third preset event), the button can be triggered from the Normal state to the Hover state. Thus, after the PC terminal determines that the mouse event is the mouse hovering event, the PC terminal can determine that the button has been currently switched from the Normal state to the Hover state.

After the button is switched to the Hover state, the PC terminal can continue to monitor a mouse event with respect to the region of the button. If, after the button is switched to the Hover state, another mouse event with respect to the region of the button is monitored, and it is determined that said another mouse event is a mouse click event (a fourth preset event), the button can be triggered from the Hover state to the Press state. Thus, after the PC terminal determines that the mouse event is the mouse click event, the PC terminal can determine that the button has been currently switched from the Hover state to the Press state.

As described above, when the state of the button is being switched, the button can be switched from the Normal state to the Hover state, or can be switched from the Hover state to the Press state. Accordingly, in the present embodiment, in order to unify the states of the button, a fluctuating pattern can be uniformly presented around the button, regardless the button is being switched from the Normal state to the Hover state or from the Hover state to the Press state. Thereby, when the button is being switched from the Normal state to the Hover state, the pattern can indicate an interaction to the user, and when the button is being switched from the Hover state to the Press state, the pattern can function in place of the Loading state, to represent the loading process of the event triggered by the switch of the state of the button from the Hover state to the Press state.

In implementation, since presenting an interaction indication to the user is typically a static process, when the button is being switched from the Normal state to the Hover state, the fluctuating pattern can be presented around the button in a static manner to indicate interaction to the user. In addition, since the loading process of an event triggered by the switch of the state from the Hover state to the Press state is typically a dynamic process, when the button is being switched from the Hover state to the Press state, the fluctuating pattern can be presented around the button in a dynamic manner with a preset fluctuation cycle, and after the loading process of the event triggered by the button being switched from the Hover state to the Press state is completed, presenting of the fluctuating pattern is ceased. Thereby, the whole loading process of the event can be presented to the user by presenting the fluctuating pattern in the dynamic manner.

In one implementation, the fluctuating pattern can be a ripple pattern. Hereinafter, as an example, the fluctuating pattern is a ripple pattern.

In the present embodiment, when the user switches the button from the Normal state to the Hover state through a long press operation or a mouse hovering operation with respect to the button, a ripple pattern around the button can be presented in a static manner, so as to indicate the interaction to the user. After the user sees the interaction indication, he can accurately learn that the button has currently been switched to the Hover state. In addition, to improve the indication effect, in case where the button is switched from the Normal state to the Hover state through a long press operation, a pressure of a press operation with respect to the region of the button can be acquired, and the ripple pattern with a preset number of lines based on the pressure of the press operation is presented. In this case, the number of the lines of the presented ripple pattern can be based on the magnitude of the pressure of the press operation. That is, the larger the pressure of the press operation is, the more the lines of the ripple pattern presented around the button in the static manner are.

Figure 4:
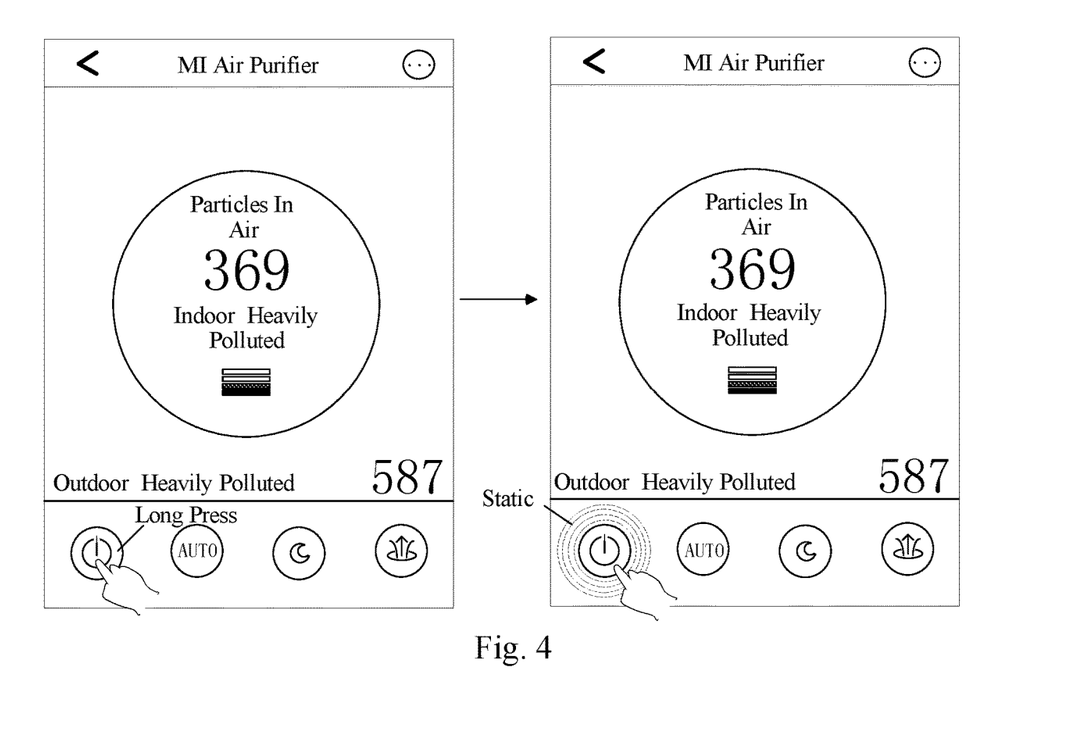
FIG. 4 is a schematic diagram showing an interaction interface according to an exemplary embodiment.

For example, as shown in FIG. 4, for example, the button is an on/off button of an APP for remotely controlling a smart device which is installed on a terminal. When a user performs a long press operation with respect to the region where the button is positioned, to trigger the button to be switched from the Normal state to the Hover state, a ripple pattern around the button can be presented in a static manner, so as to indicate the interaction to the user. After he sees the ripple pattern around the button, the user can accurately learn that the button has currently been switched to the Hover state. In addition, to improve the indication effect, the terminal can further acquire a pressure of a press operation with respect to the region of the button, and the ripple pattern with a preset number of lines based on the pressure of the press operation is presented. In this case, the larger the pressure of the press operation is, the more the lines of the ripple pattern presented around the button in the static manner are.

Compared with the conventional implementation, since the ripple pattern is presented around the button, when the user presses and holds the button with his finger, the interaction indication presented after the state of the button is switched won't be obstructed from the user's view. The presentation is more intuitive, and thus a clear and accurate interaction indication can be presented to the user.

In the present embodiment, after the button is switched from the Hover state to the Press state through a releasing operation after the long press operation or a mouse click operation, the ripple pattern around the button can be presented as diffusing outward from a periphery of the button with a cycle and at a preset diffusion rate.

In implementation, a ripple generating source can be provided at the periphery of the button. Thus, the terminal can control the ripple generating source to generate a ripple at a fixed time interval in the background, and control each ripple to diffuse outward at a preset diffusion rate. Moreover, in order to improve the interaction effect, the ripple pattern can gradually attenuate during the outward diffusion. The terminal can control the interaction interface to refresh the interface periodically at a certain frequency. After each refresh, a current position and the attenuation of the ripple are calculated, and then the ripple is presented on the interaction interface. The refresh frequency of the interface can be set depending on practical requirements. For example, in implementation, a higher refresh frequency can be set to ensure a satisfactory effect. The attenuation process of the ripple pattern can be represented through varied brightness of the ripples.

In the present embodiment, at the time when the loading of the event triggered by the switch of the state of the button from the Hover state to the Press state is completed, the periodic outer diffusion of the ripple pattern around button can be ceased synchronously. Thereby, the dynamic presentation of the fluctuating pattern can be fully associated with the loading process of the event, and the whole loading process of the event can be presented to the user by synchronously presenting the wave-ripple pattern.

Figure 5:
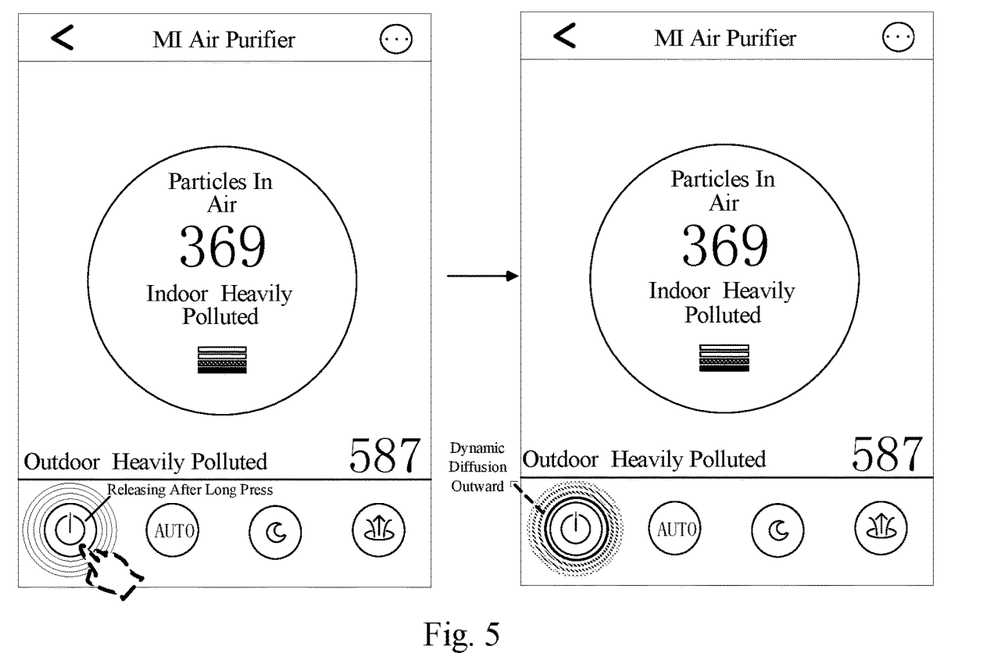
FIG. 5 is a schematic diagram showing another interaction interface according to an exemplary embodiment.

For example, as shown in FIG. 5, again, the button is for example an on/off button of an APP for remotely controlling a smart device which is installed on a touch-screen smart terminal. When a user performs a releasing operation after a long press with respect to the button, the button is switched from the Hover state to the Press state, and typically an event for starting the smart device can be triggered. After the event is triggered, the terminal can send a starting instruction to the smart device. After the smart device receives the starting instruction, it is turned on, and after the smart device is properly turned on, the smart device returns a response message to the terminal indicating that the smart device has been properly turned on. In this case, as shown in FIG. 5, after the terminal sends the starting instruction to the smart device, a ripple pattern can be presented around the button which gradually attenuates and diffuses outward from a periphery of the button with a cycle and at a preset diffusion rate. Since the diffusion process of the ripple pattern is totally synchronous with the loading process of the event, the user can see the animation effect in the dynamic presentation of the ripple pattern, and learn the whole synchronous loading process of the event. Compared with the conventional implementation, since the ripple pattern is presented around the button, the function of the Loading state can be fully replaced. Thereby, it can eliminate the need to provide a separate floating layer for presenting a loading animation corresponding to the Loading state. This can effectively increase design supporting capability on per unit area of the interaction interface, so the design space can be sufficiently utilized, and the design efficiency can be improved.

It should be noted that, after the button is switched to the Press state, the button is in the Press state. At this time, if he wants to resume the "Pressed" button to an un-pressed state, the user can perform another designated touch operation or mouse operation with respect to the region where the button is positioned, to complete the switch of the button. In this case, the Press state of the button can be considered as a current Normal state, and the Normal state before the button is pressed can be considered as a current Press state. When the button is switched from the current Normal state to the Press state, the button is in an "un-pressed" state. The switching of the button can be referred to the above embodiments, which will not be elaborated in the present embodiment.

In the above embodiment, it is determined whether a state of the button is being switched, and a fluctuating pattern is presented around the button when a state of the button is being switched. The fluctuating pattern is used for indicating interaction and representing a loading process of an event triggered by the switch of the state of the button. Thereby, in the present disclosure, the Hover state, Press state and Loading state of a button can be uniformly devised. It reserves the interaction functions of the button states and loading animation in the conventional interface interaction solution. Moreover, the styles of the button in different states and loading animation of the Loading state in the conventional solution are unified to a uniform fluctuating pattern disposed around the button, for indicating interaction to the user and representing the loading process of the event triggered by the switch of the state of the button. It can incorporate visual focus and operation point. A clear and accurate interaction indication and the whole interaction process can be presented to the user during button interaction, improving the user experience during interaction.

Corresponding to the above embodiments of methods for interaction with a button, the present disclosure provides an embodiment of a device.

Figure 6:
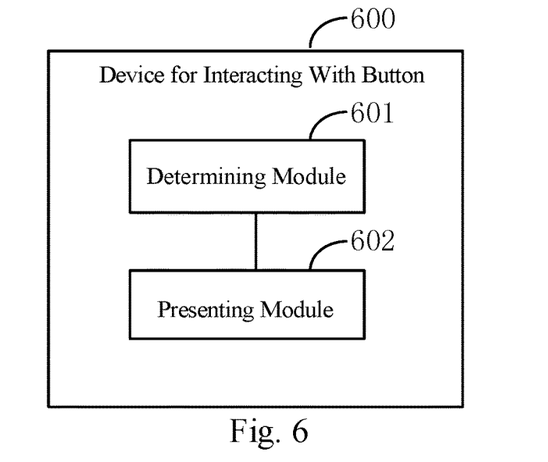
FIG. 6 is a block diagram illustrating a device for interacting with a button according to an exemplary embodiment.

FIG. 6 is a block diagram illustrating a device for interacting with a button according to an exemplary embodiment.

As shown in FIG. 6, a device 600 for interacting with a button according to an exemplary embodiment, includes a determining module 601 and a presenting module 602. The determining module 601 is configured to determine whether a state of the button is being switched. The presenting module 602 is configured to present a fluctuating pattern around the button when a state of the button is being switched. The fluctuating pattern is used for indicating interaction and representing a loading process of an event triggered by the switch of the state of the button.

In the above embodiment, it is determined whether a state of the button is being switched, and a fluctuating pattern is presented around the button when a state of the button is being switched. The fluctuating pattern is used for indicating interaction and representing a loading process of an event triggered by the switch of the state of the button. Thereby, in the present disclosure, the Hover state, Press state and Loading state of a button can be uniformly devised. It reserves the interaction functions of the button states and loading animation in the conventional interface interaction solution. Moreover, the styles of the button states and loading animation of the Loading state in the conventional solution are unified to a uniform fluctuating pattern disposed around the button, for indicating interaction to the user and representing the loading process of the event triggered by the switch of the state of the button. It can incorporate visual focus and operation point. A clear and accurate interaction indication and the whole interaction process can be presented to the user during button interaction, improving the user experience during interaction.

Figure 7:
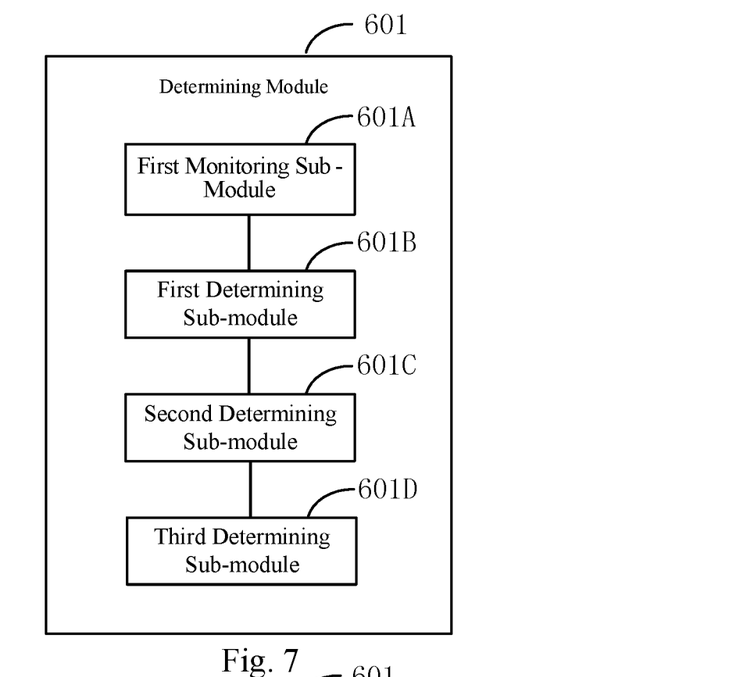
FIG. 7 is a block diagram illustrating another device for interacting with a button according to an exemplary embodiment.

FIG. 7 is a block diagram illustrating another device for interacting with a button according to an exemplary embodiment, based on the embodiment as shown in FIG. 6. The determining module 601 can include a first monitoring sub-module 601A, a first determining sub-module 601B, a second determining sub-module 601C and a third determining sub-module 601D. The first monitoring sub-module 601A is configured to monitor a touch event with respect to a region of the button. The first determining sub-module 601B is configured to determine whether the touch event is a first preset event. The second determining sub-module 601C is configured to, when the first determining sub-module determines that the touch event is the first preset event, determine that the button is being switched from a Normal state to a Hover state. The third determining sub-module 601D is configured to, if after the button is switched to the Hover state, the first monitoring sub-module monitors another touch event with respect to the region of the button and the first determining sub-module determines that said another touch event is a second preset event, determine that the button is being switched from the Hover state to a Press state.

Figure 8:
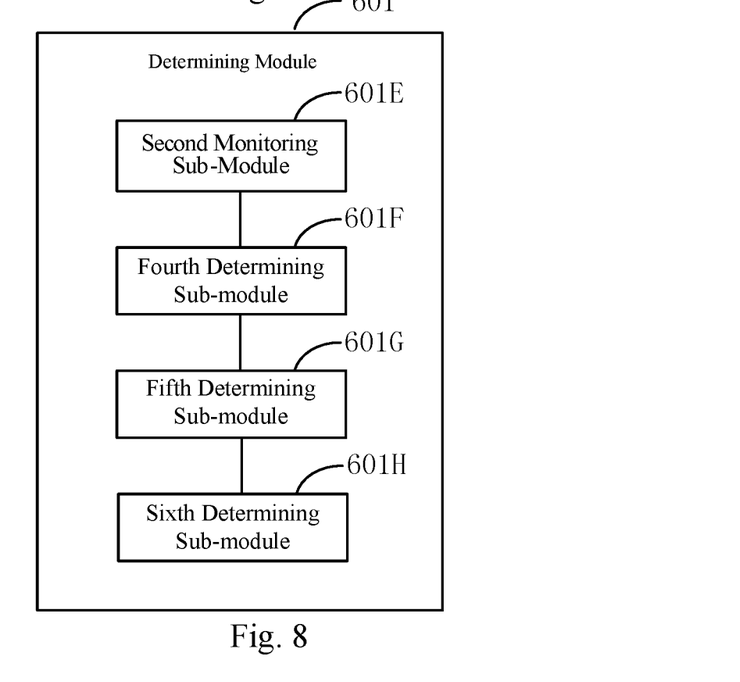
FIG. 8 is a block diagram illustrating another device for interacting with a button according to an exemplary embodiment.

FIG. 8 is a block diagram illustrating another device for interacting with a button according to an exemplary embodiment, based on the embodiment as shown in FIG. 6. The determine module 601 can also include: a second monitoring sub-module 601E, a fourth determining sub-module 601F, a fifth determining sub-module 601G and a sixth determining sub-module 601H. The second monitoring sub-module 601E is configured to monitor a mouse event with respect to a region of the button. The fourth determining sub-module 601F is configured to determine whether the mouse event is a third preset event. The fifth determining sub-module 601G is configured to, when the mouse event is the third preset event, determine that the button is being switched from a Normal state to a Hover state. The sixth determining sub-module 601H is configured to, after the button is switched to the Hover state, the second monitoring sub-module monitors another mouse event with respect to the region of the button, and when the fourth determining sub-module 601F determines that said another mouse event is a fourth preset event, determine that the button is being switched from the Hover state to a Press state.

It should be noted that, the second monitoring sub-module 601E, the fourth determining sub-module 601F, the fifth determining sub-module 601G and the sixth determining sub-module 601H above as shown in FIG. 8 can also be included in the device according to the above embodiment as shown in FIG. 7. This is not limited in the present disclosure.

Figure 9:
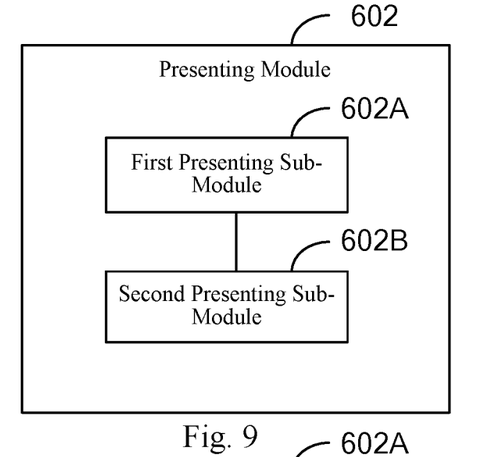
FIG. 9 is a block diagram illustrating another device for interacting with a button according to an exemplary embodiment.

FIG. 9 is a block diagram illustrating another device for interacting with a button according to an exemplary embodiment, based on the embodiment as shown in FIG. 6. The presenting module 602 can also include a first presenting sub-module 602A and a second presenting sub-module 602B. The first presenting sub-module 602A is configured to, when the button is being switched from the Normal state to the Hover state, present the fluctuating pattern around the button in a static manner to indicate interaction. The second presenting sub-module 602B is configured to, when the button is being switched from the Hover state to the Press state, present the fluctuating pattern around the button in a dynamic manner with a preset fluctuation cycle, and after the loading process of the event triggered by the button being switched from the Hover state to the Press state is completed, cease presenting the fluctuating pattern.

It should be noted that, the first presenting sub-module 602A and the second presenting sub-module 602B above as shown in FIG. 9 can also be included in the device according to the above embodiment as shown in FIGS. 7-8. This is not limited in the present disclosure.

Figure 10:
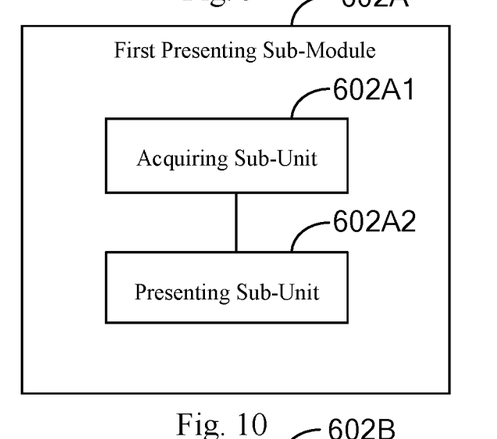
FIG. 10 is a block diagram illustrating another device for interacting with a button according to an exemplary embodiment.

FIG. 10 is a block diagram illustrating another device for interacting with a button according to an exemplary embodiment, based on the embodiment as shown in FIG. 9. When the fluctuating pattern is a ripple pattern, the first presenting sub-module 602A can include an acquiring sub-unit 602A1 and a presenting sub-unit 602A2. The acquiring sub-unit 602A1 is configured to acquire a pressure of a press operation with respect to the region of the button. The presenting sub-unit 602A2 is configured to present the ripple pattern with a preset number of lines based on the pressure of the press operation around the button in the static manner. The number of lines of the ripple pattern presented around the button in the static manner may be proportionate to the degree of the pressure of the press operation.

It should be noted that, the acquiring sub-unit 602A1 and the presenting sub-unit 602A2 above as shown in FIG. 10 can also be included in the device according to the above embodiment as shown in FIGS. 6-8. This is not limited in the present disclosure.

Figure 11:
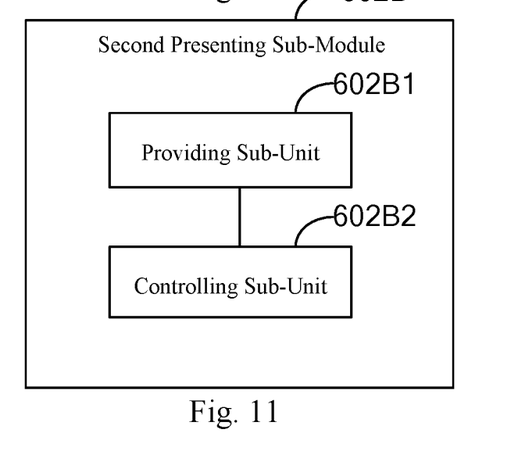
FIG. 11 is a block diagram illustrating another device for interacting with a button according to an exemplary embodiment.

FIG. 11 is a block diagram illustrating another device for interacting with a button according to an exemplary embodiment, based on the embodiment as shown in FIG. 9. When the fluctuating pattern is a ripple pattern, the second presenting sub-module 602B can include: a providing sub-unit 602B1 and a controlling sub-unit 602B2. The providing sub-unit 602B1 is configured to provide a ripple generating source at the periphery of the button. The controlling sub-unit 602B2 is configured to control the ripple generating source to generate a ripple pattern which diffuses outward from a periphery of the button and gradually attenuates, with a cycle and at a preset diffusion rate.

It should be noted that, the providing sub-unit 602B1 and the controlling sub-unit 602B2 above as shown in FIG. 11 can also be included in the device according to the above embodiment as shown in FIGS. 6-8 or FIG. 10. This is not limited in the present disclosure.

Specific implementation of the operations and functions of the modules or units in the above devices can be referred to the implementation of corresponding steps in the above methods, which will not be repeated herein.

For the embodiments regarding devices, since they correspond to the embodiments regarding methods, they can be referred to the description of the embodiments regarding methods. The embodiments regarding devices described above are merely illustrative. The units described as separate components may be or may not be physically separate, and the components illustrated as a units may be or may not be physical units, and may be at the same location, or may be distributed to multiple units over the network. A part of or the whole of the modules can be selected to achieve the objective of the present disclosure as desired. One skilled in the art can understand and practice the embodiments without paying any creative labor.

Correspondingly, the present disclosure provides a device for interacting with a button, including a processor, and a memory for storing instructions executable by the processor. The processor is configured to perform determining whether a state of the button is being switched among a normal state, a hover state, and a press state, and presenting a first predetermined pattern around the button when a state of the button is being switched from the normal state to the hover state, and presenting a second predetermined pattern around the button when the state of the button is being switched from the hover state to the press state. The first and second predetermined patterns are displayed to be visible to a user switching the button.

Correspondingly, the present disclosure also provides a terminal including a memory and one or more programs. The one or more programs are stored in the memory, and one or more processors are configured to execute the one or more programs that contain instructions to cause the one or more processors to perform determining whether a state of the button is being switched among a normal state, a hover state, and a press state, and presenting a first predetermined pattern around the button when a state of the button is being switched from the normal state to the hover state, and presenting a second predetermined pattern around the button when the state of the button is being switched from the hover state to the press state. The first and second predetermined patterns are displayed to be visible to a user switching the button.

Figure 12:
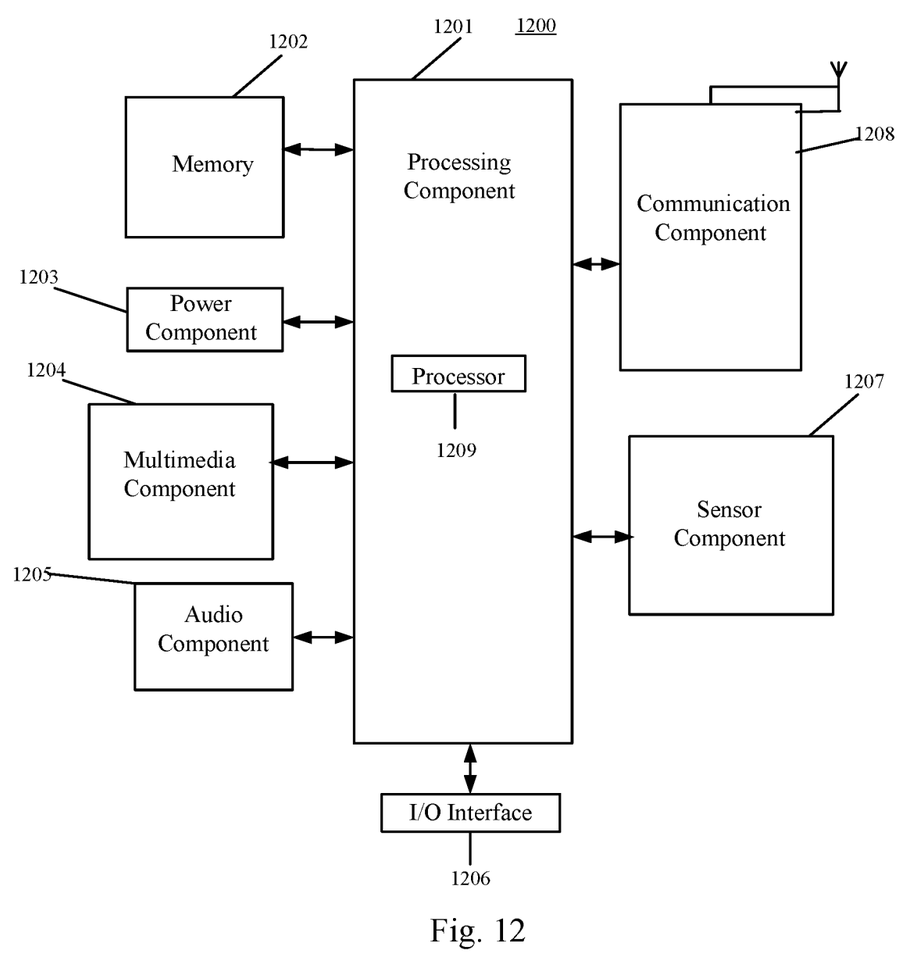
FIG. 12 is a block diagram illustrating a device for interacting with a button according to an exemplary embodiment.

FIG. 12 is a block diagram of a device for interacting with a button according to an exemplary embodiment.

As shown in FIG. 12 is a device 1200 for interacting with a button according to an exemplary embodiment. For example, the device 1200 may be a mobile phone, a computer, a digital broadcast terminal, a messaging device, a gaming console, a tablet, a medical device, exercise equipment, a personal digital assistant, and the like.

Referring to FIG. 12, the device 1200 may include one or more of the following components: a processing component

1201, a memory 1202, a power component 1203, a multimedia component 1204, an audio component 1205, an input/output (I/O) interface 1206, a sensor component 1207, and a communication component 1208.

The processing component 1201 typically controls overall operations of the device 1200, such as the operations associated with display, telephone calls, data communications, camera operations, and recording operations. The processing component 1201 may include one or more processors 1209 to execute instructions to perform all or part of the steps in the above described methods. Moreover, the processing component 1201 may include one or more modules which facilitate the interaction between the processing component 1201 and other components. For instance, the processing component 1201 may include a multimedia module to facilitate the interaction between the multimedia component 1204 and the processing component 1201.

The memory 1202 is configured to store various types of data to support the operation of the device 1200. Examples of such data include instructions for any applications or methods operated on the device 1200, contact data, phonebook data, messages, pictures, video, etc. The memory 1202 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1203 provides power to various components of the device 1200. The power component 1203 may include a power management system, one or more power sources, and any other components associated with the generation, management, and distribution of power in the device 1200.

The multimedia component 1204 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1204 includes a front camera and/or a rear camera. The front camera and the rear camera may receive an external multimedia datum while the device 1200 is in an operation mode, such as a photographing mode or a video mode. Each of the front camera and the rear camera may be a fixed optical lens system or have focus and optical zoom capability.

The audio component 1205 is configured to output and/or input audio signals. For example, the audio component 1205 includes a microphone ("MIC") configured to receive an external audio signal when the device 1200 is in an operation mode, such as a call mode, a recording mode, and a voice recognition mode. The received audio signal may be further stored in the memory 1202 or transmitted via the communication component 1208. In some embodiments, the audio component 1205 further includes a speaker to output audio signals.

The I/O interface 1206 provides an interface between the processing component 1201 and peripheral interface modules, such as a keyboard, a click wheel, buttons, and the like. The buttons may include, but are not limited to, a home button, a volume button, a starting button, and a locking button.

The sensor component 1207 includes one or more sensors to provide status assessments of various aspects of the device 1200. For instance, the sensor component 1207 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1207 may include a proximity sensor configured to detect the presence of nearby objects without any physical contact. The sensor component 1207 may also include a light sensor, such as a CMOS or CCD image sensor, for use in imaging applications. In some embodiments, the sensor component 1207 may also include an accelerometer sensor, a gyroscope sensor, a magnetic sensor, a pressure sensor, or a temperature sensor.

The communication component 1208 is configured to facilitate communication, wired or wirelessly, between the device 1200 and other devices. The device 1200 can access a wireless network based on a communication standard, such as WiFi, 2G, or 3G, or a combination thereof. In one exemplary embodiment, the communication component 1208 receives a broadcast signal or broadcast associated information from an external broadcast management system via a broadcast channel. In one exemplary embodiment, the communication component 1208 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1202, executable by the processor 1209 in the device 1200, for performing the above-described methods. For example, the non-transitory computer-readable storage medium may be a ROM, a RAM, a CD-ROM, a magnetic tape, a floppy disc, an optical data storage device, and the like.

When instructions in the storage medium are executed by a processor of a mobile terminal, the mobile terminal is enabled to perform a method for interacting with a button, including determining whether a state of the button is being switched among a normal state, a hover state, and a press state, presenting a first predetermined pattern around the button when a state of the button is being switched from the normal state to the hover state, and presenting a second predetermined pattern around the button when the state of the button is being switched from the hover state to the press state. The first and second predetermined patterns are displayed to be visible to a user interacting the button.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for interacting with a button on a display screen for controlling a smart device, comprising:
   determining whether a state of the button is being switched among a normal state, a hover state, and a press state;
   presenting a first predetermined pattern around the button in response to determining that a state of the button is being switched from the normal state to the hover state;
   presenting a second predetermined pattern around the button in a dynamic manner with a preset fluctuation cycle in response to determining that the state of the button is being switched from the hover state to the press state, wherein the second predetermined pattern is synchronized with a loading process of an event for controlling the smart device triggered by the button being switched from the hover state to the press state, the second predetermined pattern is presented when a. long press operation is performed and released, wherein the second predetermined pattern is a ripple pattern, and wherein the presenting the second predetermined pattern around the button in the dynamic manner with the preset fluctuation cycle comprises:
      providing a ripple generating source at the periphery of the button; and
      controlling the ripple generating source to generate a ripple at a fixed time interval; and
   ceasing presenting the second predetermined pattern around the button in response to the loading process of the event for controlling the smart device triggered by the button being switched from the hover state to the press state is completed;
   wherein the first and second predetermined patterns are displayed on the display screen to a user interacting with the button.

2. The method of claim 1, wherein determining whether a state of the button is being switched comprises:
   determining that a touch event occurs on a region of the button;
   determining whether the touch event is a first preset event; and
   when the touch event is the first preset event, determining that the state of the button is being switched from the normal state to the hover state.

3. The method of claim 2, wherein determining whether a state of the button is being switched comprises:
   determining whether the touch event is a second preset event; and
   determining that the button is being switched from the hover state to the press state when the touch event is the second preset event.

4. The method of claim 1, wherein determining whether a state of the button is being switched comprises:
   determining that a mouse event occurs on a region of the button;
   determining whether the mouse event is a third preset event; and
   when the mouse event is the third preset event, determining that the button is being switched from the normal state to the hover state.

5. The method of claim 4, wherein determining whether a state of the button is being switched comprises:
   determining whether the mouse event is a fourth preset event; and
   determining that the button is being switched from the hover state to the press state when the mouse event is the fourth preset event.

6. The method of claim 2, wherein presenting a first predetermined pattern around the button comprises presenting the first predetermined pattern around the button in a static manner.

7. The method of claim 4, wherein presenting a first predetermined pattern around the button comprises presenting the first predetermined pattern around the button in a static manner.

8. The method of claim 6, wherein the first predetermined pattern is a ripple pattern, and presenting the first predetermined pattern around the button in a static manner comprises: obtaining a pressure of the touch event on the region of the button; and
   presenting the ripple pattern with a preset number of lines based on the pressure of the touch event around the button in the static manner,
   wherein the number of lines of the ripple pattern presented around the button is proportionate to the pressure of the touch event.

9. The method of claim 1, wherein the presenting the second predetermined pattern around the button in the dynamic manner with the preset fluctuation cycle further comprises:
   controlling the ripple generating source to generate the ripple pattern which periodically diffuses outward from the periphery of the button and gradually attenuates at a preset diffusion rate.

10. A device for interacting with a button on a display screen for controlling a smart device, comprising:
    a processor; and
    a memory for storing instructions executable by the processor;
    wherein the processor is configured to perform:
    determining whether a state of the button is being switched among a normal state, a hover state, and a press state;
    presenting a first predetermined pattern around the button in response to determining that a state of the button is being switched from the normal state to the hover state;
    presenting a second predetermined pattern around the button in a dynamic manner with a preset fluctuation cycle in response to determining that the state of the button is being switched from the hover state to the press state, wherein the second predetermined pattern is synchronized with a loading process of an event for controlling the smart device triggered by the button being switched from the hover state to the press state, the second predetermined pattern is presented when a long press operation is performed and released, wherein the second predetermined pattern is a ripple pattern, and wherein the presenting the second predetermined pattern around the button in the dynamic manner with the preset fluctuation cycle comprises:
  providing a ripple generating source at the periphery of the button; and
  controlling the ripple generating source to generate a ripple at a fixed time interval; and
ceasing presenting the second predetermined pattern around the button in response to the loading process of the event triggered by the button being switched from the hover state to the press state is completed;
wherein the first and the second predetermined patterns are displayed on the display screen to a user interacting with the button.

11. The device of claim 10, wherein determining whether a state of the button is being switched comprises:
  determining that a touch event occurs on a region of the button;
  determining whether the touch event is a first preset event; and
  when the touch event is the first preset event, determining that the button is being switched from the normal state to the hover state.

12. The device of claim 11, wherein determining whether a state of the button is being switched comprises:
  determining whether the touch event is a second preset event; and
  determining that the button is being switched from the hover state to the press state when the touch event is the second preset event.

13. The device of claim 10, wherein determining whether a state of the button is being switched comprises:
  determining that a mouse event occurs on a region of the button;
  determining whether the mouse event is a third preset event; and
  when the mouse event is the third preset event, determining that the button is being switched from the normal state to the hover state.

14. The device of claim 13, wherein determining whether a state of the button is being switched comprises:
  determining whether the mouse event is a fourth preset event; and
  determining that the button is being switched from the hover state to the press state when the mouse event is the fourth preset event.

15. The device of claim 12, wherein the first preset event is a long press event, and the second preset event is a releasing event.

16. The device of claim 14, wherein the third preset event is a mouse hovering event, and the fourth preset event is a mouse click event.

17. The device of claim 11, wherein presenting a first predetermined pattern around the button comprises presenting the first predetermined pattern around the button in a static manner.

18. The device of claim 17, wherein the first predetermined pattern is a ripple pattern, and presenting the first predetermined pattern around the button in a static manner comprises: obtaining a pressure of the touch event on the region of the button; and
  presenting the ripple pattern with a preset number of lines based on the pressure of the touch event around the button in the static manner,
  wherein the number of lines of the ripple pattern presented around the button is proportionate to the pressure of the touch event.

19. The device of claim 10, wherein the presenting the second predetermined pattern around the button in the dynamic manner with the preset fluctuation cycle further comprises:
  controlling the ripple generating source to generate the ripple pattern which periodically diffuses outward from the periphery of the button and gradually attenuates at a preset diffusion rate.

20. A non-transitory computer-readable storage medium storing instructions that, when being executed by a processor of a device for interacting with a button on a display screen for controlling a smart device, cause the terminal to perform:
  determining whether a state of the button is being switched among a normal state, a hover state, and a press state;
  presenting a first predetermined pattern around the button in response to determining that a state of the button is being switched from the normal state to the hover state;
  presenting a second predetermined pattern around the button in a dynamic manner with a preset fluctuation cycle in response to determining that the state of the button is being switched from the hover state to the press state, wherein the second predetermined pattern is synchronized with a loading process of an event for controlling the smart device triggered by the button being switched from the hover state to the press state, the second predetermined pattern is presented when a long press operation is performed and released, wherein the second predetermined pattern is a ripple pattern, and wherein the presenting the second predetermined pattern around the button in the dynamic manner with the preset fluctuation cycle comprises:
    providing a ripple generating source at the periphery of the button; and
    controlling the ripple generating source to generate a ripple at a fixed time interval; and
  ceasing presenting the second predetermined pattern around the button in response to the loading process of the event triggered by the button being switched from the hover state to the press state is completed.;
  wherein the first and second predetermined patterns are displayed on the display screen to a user interacting with the button.

* * * * *